No. 732,845. PATENTED JULY 7, 1903.
E. D. GLEASON.
MECHANICAL MOVEMENT.
APPLICATION FILED SEPT. 22, 1900.
NO MODEL. 2 SHEETS—SHEET 1.
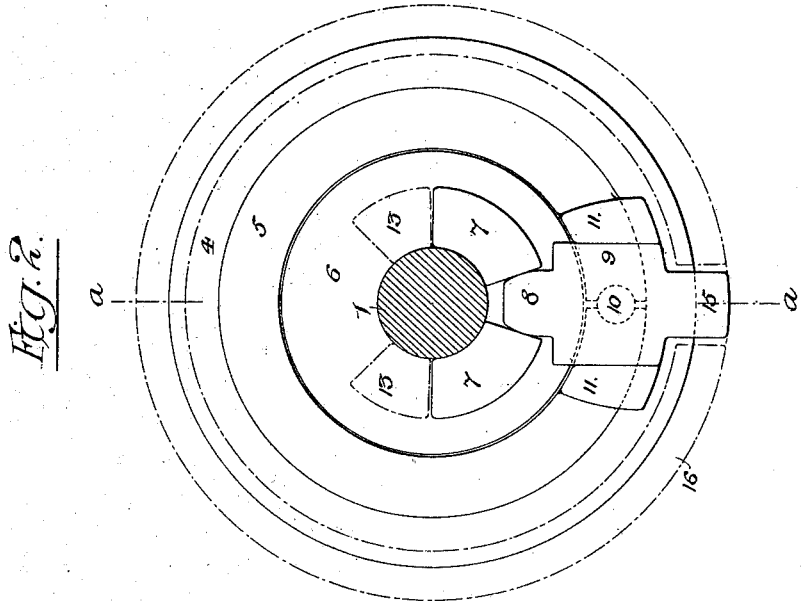
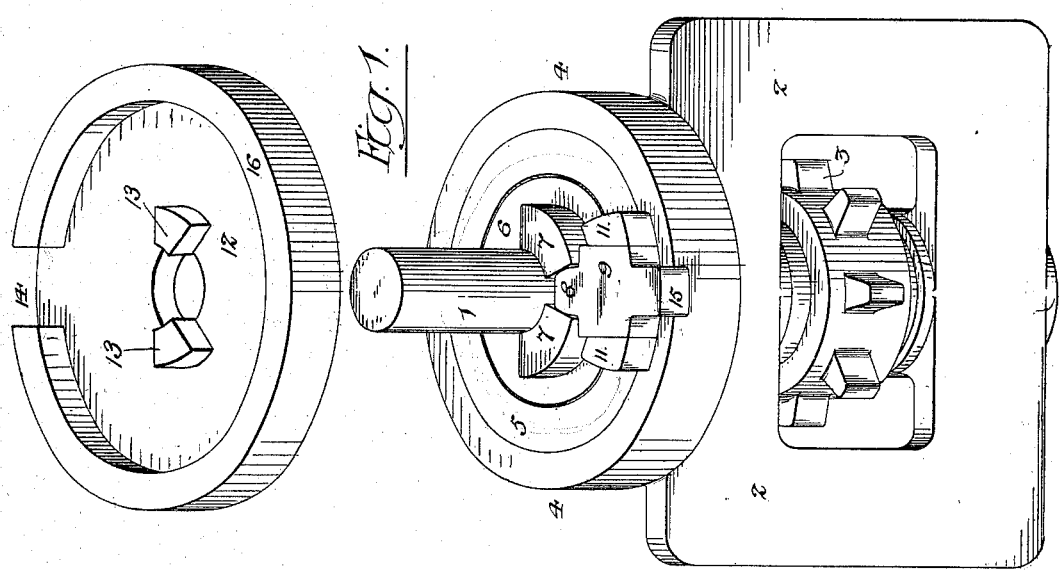
Witnesses:—
Hamilton D. Turner
Louis W. F. Holchkiss
Inventor:
Edward D. Gleason.
by his Attorneys:—
Howson & Howson

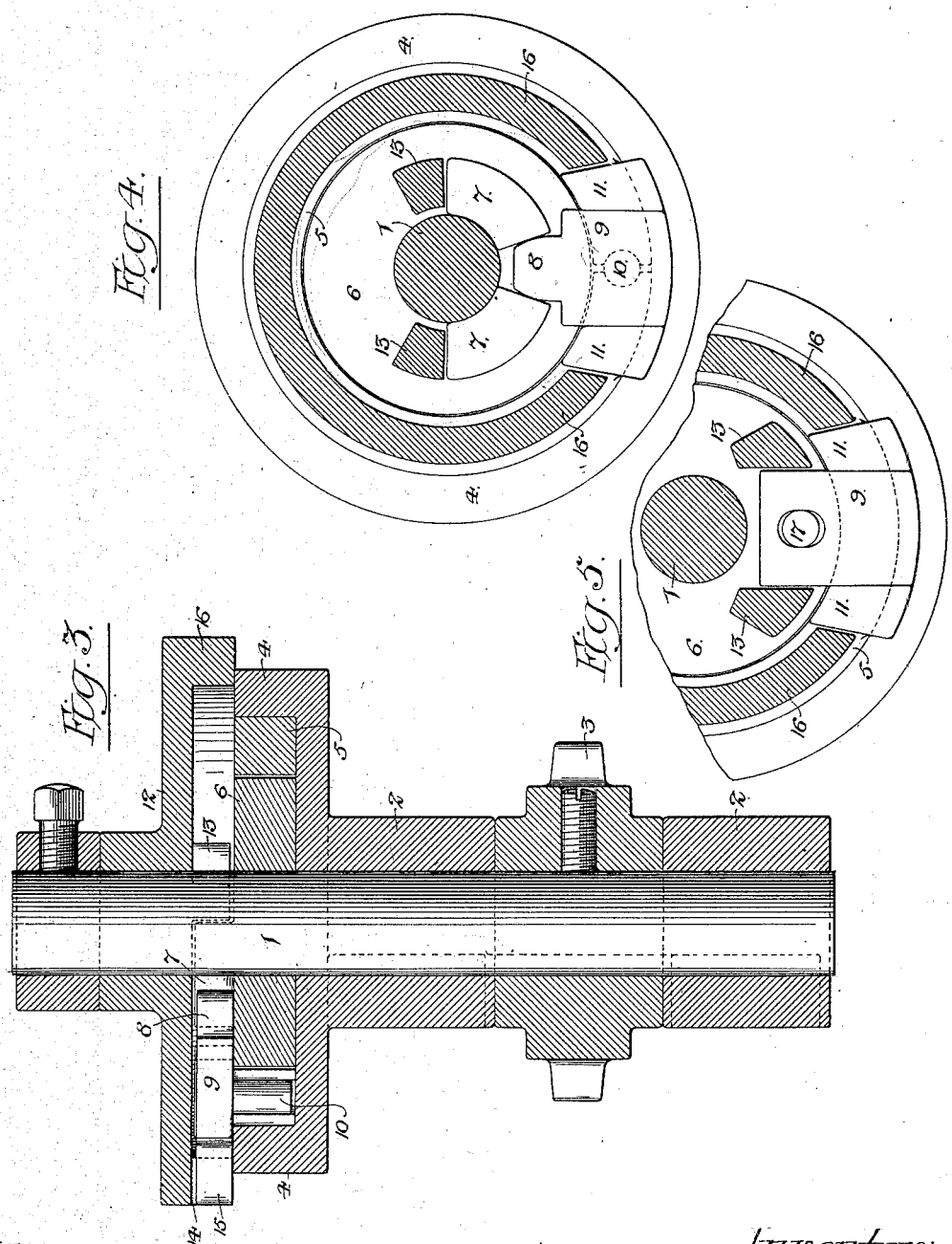

No. 732,845.

Patented July 7, 1903.

UNITED STATES PATENT OFFICE.

EDWARD D. GLEASON, OF PHILADELPHIA, PENNSYLVANIA, ASSIGNOR TO HORACE SHEBLE, OF PHILADELPHIA, PENNSYLVANIA.

MECHANICAL MOVEMENT.

SPECIFICATION forming part of Letters Patent No. 732,845, dated July 7, 1903.

Application filed September 22, 1900. Serial No. 30,834. (No model.)

*To all whom it may concern:*

Be it known that I, EDWARD D. GLEASON, a citizen of the United States, residing in Philadelphia, Pennsylvania, have invented a certain Mechanical Movement, of which the following is a specification.

My invention consists of a mechanical movement whereby a shaft or spindle may be readily turned in either direction by power properly applied, but will be firmly locked against displacement in any of its positions of adjustment.

In the accompanying drawings, Figure 1 is a perspective view of parts constituting a mechanical movement in accordance with my invention, one element being removed and inverted in order to more fully illustrate its construction. Fig. 2 is a sectional plan view with the outline of the acting parts of the top element shown by dotted lines. Fig. 3 is a view partly in side elevation and partly in vertical section on the line $a\ a$, Fig. 2; and Figs. 4 and 5 are sectional plan views illustrating modifications of the invention.

In all of the figures of the drawings, 1 represents the shaft or spindle to which it is desired to impart movement, which shaft or spindle may constitute an element of any desired mechanism. As shown in the drawings, it is adapted to a bearing in a frame or fixed structure 2 and is provided with a toothed wheel 3, whereby its movement may be transmitted to another element of the mechanism. The shaft 1 may, for instance, form one of the elements of a steering mechanism for vessels, in which case the rudder, while readily movable by the steering-wheel, will be locked in any of its positions of adjustment—that is to say, it cannot be accidentally moved by strains brought to bear upon it and will not transmit such strains to the steering-wheel.

The bearing of the fixed structure 2 is expanded at the top, so as to form a flanged cup 4, into which snugly fits a split ring 5 of such character that when expanded it will bind firmly upon the inner wall of the vertical flange of the cup, so as to prevent it from being turned therein.

Suitably secured to the shaft or spindle 1 is a disk 6, which occupies a position within the split ring 5 and has projecting lugs 7, the said shaft, with its disk and lugs, constituting one of the two principal elements or members of my improved device. Snugly fitting between said lugs is a tooth 8 upon a lever 9, the latter having a depending pin 10, which is adapted to a bearing formed by means of semicircular recesses in the adjoining ends of the split ring 5, as shown by dotted lines in Fig. 2. The lever 9 fits snugly between lugs 11 on the split ring 5, so that any attempt to turn said lever upon the pin 10 as its fulcrum will cause it to thrust apart the lugs 11, and thus expand the split ring 5 and force it firmly into contact with the inner wall of the flange of the cup 4. The shaft or spindle 1 is thus effectually prevented from moving in either direction by any force which would cause either of the lugs 7 to act upon the tooth 8 of the lever 9 in such manner as to cause said lever to turn upon its fulcrum.

Mounted so as to be free to turn on the shaft 1 above the flanged cup 4 is a flanged disk 12, having downwardly-projecting lugs 13, which flank the lugs 7 of the disk 6, the said disk, with its lugs, constituting the second member of my device. Flange 16 of said disk 12 has a slot 14, into which projects a tongue 15 on the lever 9, the width of this slot in respect to the tongue and the disposition of the lugs 13 in respect to the lugs 7 being such that slight movement of the lever 9, sufficient to effect the expansion of the split ring 5, is permitted without imparting any movement to the disk 12 when the latter is in a position of rest.

When that member of the device of which the disk 12 is a part is turned in either direction, however, the flange 16 of the disk comes into contact with one side of the tongue 15 of the lever 9 at the same time that one of the lugs 13 of the disk comes into contact with a lug 7, forming part of the other member of the device. Consequently both the tooth 8 and tongue 15 of the lever 9 are simultaneously subjected to pressure tending to move said lever forward. Hence such movement is a bodily movement of the lever, and there is no turning of the latter upon its fulcrum and no expansion of the split ring 5, which is consequently free to turn within the flanged cup 4 of the fixed structure or frame without coupling together the two members of the device.

In the modified construction shown in Fig. 4 the tongue 15 of the lever is dispensed with, and the flange 16 of the disk 12 is in line with the lugs 11 of the split ring 5, the slot in the flange being slightly wider than the space occupied by said lugs, one or other of the latter being directly acted upon by the flange of the disk 12 when the latter is turned, and consequently imparting pressure to the lever 9 directly in line with the fulcrum of the same, so as to prevent any turning movement of the lever such as would tend to force the lugs 11 apart and expand the split ring 5.

In the structure shown in Fig. 5 there is a further modification involving a practical reversal of the parts 7 and 8 and the elimination of the fulcrum-pin 10. In this case the disk 6 has a pin 17, projecting into a slightly-elongated opening in the lever 9, the pin thus taking the place of the tooth 8 and the sides of the lever serving the same purpose as the lugs 7, the lever fulcruming upon one or other of the lugs 11, depending upon whether the disk 6 is turned to the right or to the left. The disk 6, with its lugs 7 or pin 17, simply constitute means whereby the lever 9 is brought into engagement with the shaft 1, and any available means of effecting such engagement may be employed without departing from the essential principles of my invention.

Having thus described my invention, I claim and desire to secure by Letters Patent—

1. The combination in a mechanical movement of a fixed structure, two members engaging one another so as to permit of relative motion of one member, a lever in positive engagement with both of the members and a device operative upon the fixed structure and operated upon by the lever when said lever is turned on its fulcrum by relative movement between said two members, substantially as described.

2. The combination in a mechanical movement of a fixed structure, two members engaging one another so as to permit of relative motion of one member to a limited extent, a split ring having a surface designed to frictionally engage the fixed structure and a lever fulcrumed on the ring in positive engagement with both of said members, said lever being turned on its fulcrum by motion of one member to cause the ring to grip the fixed structure, substantially as described.

3. The combination in a mechanical movement, of a fixed structure, two members engaging one another so as to permit of relative motion of one member to a limited extent, a split ring having a surface designed to frictionally engage the fixed structure and a lever having one end in engagement with one member and its other end in engagement with the second member, said lever being fulcrumed on the split ring at a point between its points of engagement with said members, substantially as described.

4. In a mechanical movement, the combination of a fixed structure with a revolubly-supported member having a projection near its periphery, a second member having a portion designed to operatively engage one of the projections on the first member, a lever engaging the other projection on the first member and also engaging the second member, with a split ring constructed to operate on the fixed structure and actuated by movement of the lever, substantially as described.

In testimony whereof I have signed my name to this specification in the presence of two subscribing witnesses.

EDWARD D. GLEASON.

Witnesses:
 JOS. H. KLEIN,
 BLANCHE R. DOBBINS.